July 1, 1947.  D. M. MORGENSTERN  2,423,153
HEADLIGHT ADAPTER
Filed Feb. 9, 1945
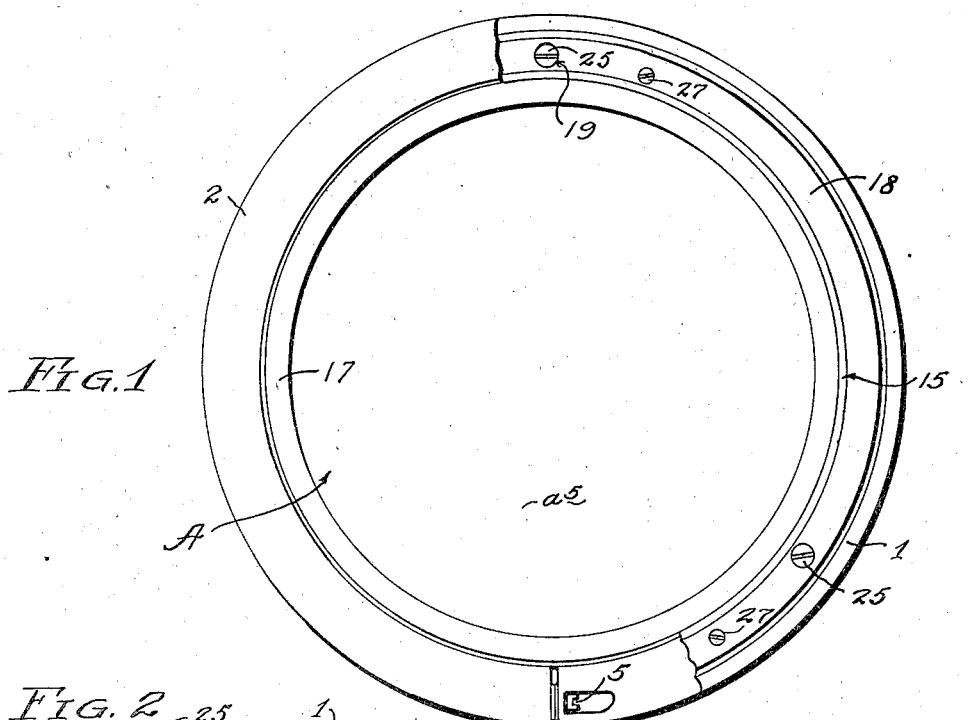
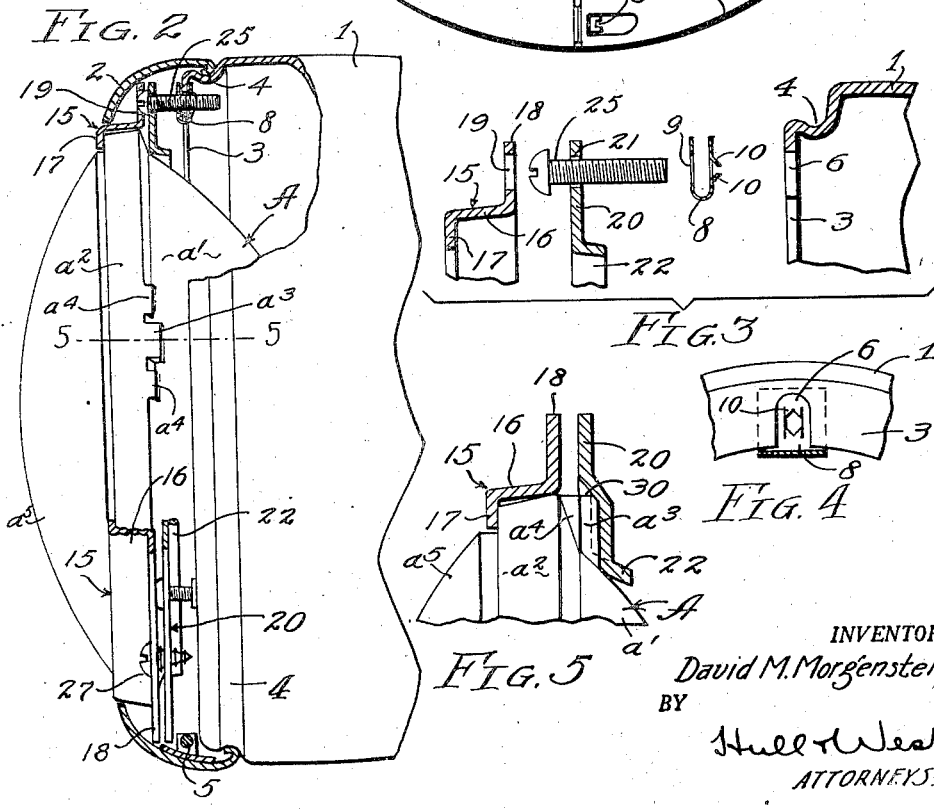
INVENTOR.
David M. Morgenstern
BY
Hull + West
ATTORNEYS.

Patented July 1, 1947

2,423,153

UNITED STATES PATENT OFFICE 2,423,153

HEADLIGHT ADAPTER

David M. Morgenstern, Cleveland, Ohio

Application February 9, 1945, Serial No. 576,937

1 Claim. (Cl. 240—41.5)

This invention is an adapter for converting an obsolete construction of automobile headlight into one employing the modern so-called "sealed beam" lamp.

A lamp of the kind referred to consists of a self-contained unit in the form of an evacuated glass bulb that includes the lens and reflector and permanently encloses the illuminating filaments, the same being referred to hereinafter as the lamp unit. The prevailing type of such unit is characterized by a circumferential bead and by locating lugs projecting rearwardly from the bead, each of which lugs is flanked by bearing bosses.

In making the conversion, all that is retained of the original headlight structure are the casing and the rim that encircles the front of the casing.

The object of the invention is to provide a very substantial and durable, yet simple and inexpensive adapter consisting of few parts that are so constructed and related as to facilitate installation so that the conversion of the headlight is reduced to a quick and easy operation, requiring little or no change in the retained parts of the original construction, or the use of any other tools than a screw driver unless some slight change is required in the part of the particular casing to which the adapter is to be connected. Aside from a few standard screws, bolts and fasteners, the adapter consists of only two parts, each desirably constructed of sheet metal, thereby promoting cheapness from the standpoints of material and manufacture and rendering the adapter yieldable, which quality compensates for any irregularities that may be present in the co-operating parts of the adapter-lamp assembly, and, at the same time, avoiding breaking strains being imposed upon the lamp unit.

The present adapter is intended for use with that type of headlight in which the casing is rigidly attached to a part of the vehicle, such as the fender; and another object of the invention is to provide a construction that facilitates adjustment of the lamp unit relative to the headlight casing for aiming the unit so as to properly direct its light beams along the highway, and which construction also enables a damaged or defective lamp unit to be easily and quickly replaced without disturbing the aiming adjustment.

The foregoing objects are attained in the embodiment of the invention illustrated in the accompanying drawing wherein Fig. 1 is a front elevation of a headlight structure incorporating my improvements, with a part of the rim of such structure broken away to disclose certain features of the adapter; Fig. 2 is a fragmentary side elevation of the headlight structure with certain parts in central vertical section and other parts forward of the plane of section broken away; Fig. 3 is a sectional detail of the adapter and the part of the casing to which it is attached in separated condition; Fig. 4 is a fragmentary front elevation of the casing, with the bolt-receiving fastener in section; and Fig. 5 is a sectional detail through the adapter and lamp unit assembly, the included portion of said unit being in elevation and the plane of section through the adapter being central of the positioning lug, as indicated by the line 5—5 of Fig. 2.

In the drawing, the headlight casing is designated 1, and the rim 2, these being the parts of the original headlight structure that are retained for association with the adapter of the present invention. The casing 1 is open at its front end where it is surrounded by a flange 3 adjacent which the casing is provided with an external groove 4 that receives the inwardly curled rear end of the rim 2 when said rim is contracted about the front of the casing by means of the screw 5. Spaced about the flange 3 are voids 6 (Figs. 3 and 4), shown as notches that open through the inner edge of the flange, and in many cases these voids are present in the original structure. However, in their absence, the flange of a casing to which the adapter is to be applied may be punched, drilled or notched to provide the voids 6. To the flange 3, over each of said voids, is applied a fastener 8, desirably of the kind known to the trade as a clip type "speed nut," the same consisting of a U-shaped piece of resilient strap metal having an opening 9 in one flange, and a slot in the other from which bolt engaging tongues 10 are struck.

The adapter includes a retainer ring that is designated generally by the reference numeral 15, the same consisting of a substantially cylindrical wall 16 from the forward end of which extends inwardly a front flange 17 and from the opposite end of which extends outwardly a rear flange 18. Spaced circumferentially about the rear flange 18 are holes 19, the spacing of said holes corresponding to that of the voids 6 in the flange 3.

20 is an adapter ring having holes 21 so arranged that they may be aligned with the holes 19 of the retainer ring when said adapter ring is placed in face-to-face relation with the rear flange 18 of the former ring. Both the retainer ring and adapter ring are desirably made of sheet metal, and to impart stiffness to the adapter ring the same is provided adjacent its inner edge with a rearwardly extending flange 22.

In making the installation, the lamp unit, designated A, is first clamped in the adapter, and the adapter-lamp assembly is then attached to the casing. The connection between said assembly and the casing is made solely through the means of bolts 25 and the aforesaid fasteners 8. The bolts 25 are first engaged rearwardly through the holes 21 of the adapter ring 20. The reflector part $a'$ of the lamp unit is then projected through the retainer ring, after which the adapter ring is placed over the front end of the lamp unit so that the peripheral bead $a^2$ of said unit is confined between the front flange 17 of the retainer ring 15 and the opposed portion of the adapter ring 20. Screws 27, desirably of the kind known as sheet metal screws, are projected freely through holes in the rear flange 18 of the retainer ring and are threadedly engaged in holes in the adapter ring, said screws serving to cut the threads in the walls of the latter holes as they are driven therethrough, according to the customary action of screws of the kind mentioned.

It is to be noted in particular that the diameter of the holes 19 in the rear flange of the retainer ring 15 is slightly less than the diameter of the heads of the bolts 25. Consequently, when the two rings are drawn firmly together by the screws 27, the bolts 25 are swiveled to the adapter-lamp assembly. Now, with the fasteners 8 applied to the flange 3 of the casing 1, the adapter, with the lamp unit clamped therein, may be attached to the casing simply by projecting the three screws through the fasteners 8, and because of the nature of said fasteners, this can be done without turning the screws. With the installation thus made, the lamp unit may be aimed so as to properly direct its beam along the highway, by turning the bolts 25. As will be noted, one of the bolts is arranged on substantially the vertical axis of the casing, in the present instance adjacent the top side thereof, while the other two bolts 25 are located on opposite sides of the casing near the bottom. Because of a definite location of the voids 6, this positions the adapter in a given relation to the casing; and, in turn, the lamp unit A is properly positioned within the adapter by the engagement of each of its locating lugs $a^3$ in a recess 30 of the adapter ring 20, as shown in Fig. 5. Although but one locating lug $a^3$ appears in the views of the drawing, usually there are three spaced irregularly about the bead $a^2$, each flanked by two bearing bosses $a^4$. There will, of course, be a corresponding number of recesses 30. Each recess 30 is preferably produced by radially slitting the ring 20 at points spaced apart circumferentially of the ring a distance about equal to the width of a locating lug and pressing the material between the slits rearwardly. The portions of the adapter ring at the sides of each recess engage the adjacent bearing bosses $a^4$.

After the adapter has been adjusted to effect proper aiming of the lamp unit, the rim 2 is engaged over the front of the casing and is drawn up tightly about the same by means of the screw 5, thereby to conceal and protect all parts of the adapter-lamp assembly excepting the front portion of the retainer ring and the lens portion $a^5$ of the lamp unit.

I filed concurrently with this application, two other applications relating to the same subject matter of invention. These bear Serial Nos. 576,938 and 576,936 and are entitled, respectively, "Lamp adapter for headlights" and "Adapter for headlights."

Having thus described my invention, what I claim is:

An adapter for attaching a lamp unit of the type described to an open front headlight casing having a flange surrounding its forward end and which flange is in a plane substantially normal to the axis of the casing and is provided with voids spaced apart circumferentially thereof, and said lamp unit being characterized by a circumferential bead and a locating lug extending rearwardly from said bead, the casing being constructed to engage with larger lighting means than the aforesaid lamp unit and having a cover ring for enclosing said flange; the adapter comprising a retainer ring having a substantially cylindrical wall, a front flange extending inwardly from the forward end of said wall and a rear flange extending outwardly from the opposite end thereof, the front flange of the retainer ring being in the frontal plane of the headlight casing when completely assembled and being adapted to bridge the gap between the cover ring and the lamp unit, an adapter ring arranged rearwardly of the retainer ring with its inner edge portion in opposed relation to said front flange, the adapter ring and the rear flange of the retainer ring having aligned holes corresponding in number and spacing with the voids in the flange of the casing, headed bolts projected rearwardly through the holes in the adapter ring and having their heads disposed between said ring and the rear flange of the retainer ring and exposed through the holes in said flange for the application of a tool to said heads, the rear flange of the retainer ring and the adapter ring having other sets of aligned holes, screws extending freely through the last mentioned holes of the rear flange of the retainer ring and threadedly engaged through the corresponding holes in the adapter ring, the lamp unit being adapted to be arranged with its circumferential bead clamped between the front flange of the retainer ring and the opposed portion of the adapter ring, the latter ring having a recess for the reception of the locating lug of the lamp unit, and U-shaped metal clips secured to the aforesaid flange of the casing over the voids therein and in which the rear end portions of the aforesaid bolts are threadedly engaged.

DAVID M. MORGENSTERN.

REFERENCES CITED

The following references are of record in the file of this patent:

UNITED STATES PATENTS

| Number | Name | Date |
|---|---|---|
| 2,138,075 | Taylor et al. | Nov. 29, 1938 |
| 2,218,326 | Anklam | Oct. 15, 1940 |
| 2,266,329 | Mead et al. | Dec. 16, 1941 |
| 2,285,591 | Larsen | June 9, 1942 |
| 2,302,494 | Falge | Nov. 17, 1942 |